Sept. 16, 1969 A. L. LEVINE 3,467,957

ELECTROSTATICALLY DIGITIZED TAPE DISPLAY DEVICE

Filed Nov. 22, 1965 2 Sheets-Sheet 1

INVENTOR.
ALFRED L. LEVINE
BY Herbert L. Davis
ATTORNEY

ELECTROSTATICALLY DIGITIZED TAPE DISPLAY DEVICE

Filed Nov. 22, 1965 2 Sheets-Sheet 2

INVENTOR.
ALFRED L. LEVINE
BY Herbert [signature]

ATTORNEY

United States Patent Office 3,467,957
Patented Sept. 16, 1969

3,467,957
ELECTROSTATICALLY DIGITIZED TAPE DISPLAY DEVICE

Alfred L. Levine, Waldwick, N.J., assignor to The Bendix Corporation, a corporation of Delaware
Filed Nov. 22, 1965, Ser. No. 509,133
Int. Cl. G08c 9/08, 9/02
U.S. Cl. 340—347 9 Claims

ABSTRACT OF THE DISCLOSURE

An electrically digitized tape display means including an elongated tape having a plurality of output channels coded to a functional scale and a common input channel. A sensing device including electrically energized capacitive means having a plurality of output plates corresponding to the output channels and a common input plate corresponding to the common input channel is arranged for relative longitudinal movement with the tape for providing digital signals corresponding to the functional scale.

This invention relates to an electrostatically digitized tape display device, more particularly, to a novel means of eliminating a mechanical linkage between the display system and a feedback device.

Heretofore, display systems have required a movable tape or marker readable against a reference line, or scale displaying the appropriate functional data. In order to utilize these data as part of a control or command system, a gear means or other mechanical linkage has been necessary to interconnect the aforementioned display items with feedback means such as potentiometers, synchros, digital encoders, and the like.

Such mechanical interconnections have certain inherent disadvantages. In means of this type, inaccuracies may result from inefficiences such as friction losses or slippage in a gear system. Moreover, such an interconnection between the tape display and the feedback device may be bulky and require excessive space within the instrumentation means. Such a consideration must be given prime concern, particularly in aircraft and space applications.

An electrostatically digitized tape display means for overcoming the aforenoted objections is disclosed in a co-pending U.S. application Ser. No. 406,680, filed Oct. 27, 1964, by the present inventor, Alfred L. Levine, and assigned to The Bendix Corporation, assignee of the present invention. The device, as broadly claimed in the referenced U.S. application Ser. No. 406,680, includes an elongated tape with a functional scale thereon and a plurality of channels coded to the functional scale. A reader head provides a plurality of electrically energized capacitive means corresponding to the channels on the tape, and the tape and the reader head are arranged for relative motion between the capacitive means and the chnnels so that digital signals corresponding to the functional scale on the tape are generated. In devices of this type, the number of channels and corresponding capacitive means is limited by the space available for containing the tape and the reader head. In many applications it is necessary to provide for an increased number of channels in a reduced space.

An object of the present invention is to provide means for avoiding the aforenoted limitations in previous tape display means.

Another object of the present invention is to provide improved means for interconnecting a tape display device and a feedback system.

Another object of this invention is to provide improved means for evolving coded digital data which may be used as feedback information.

Another object of the present invention is to provide an improved electrostatically digitized tape display means which is adaptable to limited space requirements.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

Figure 1:
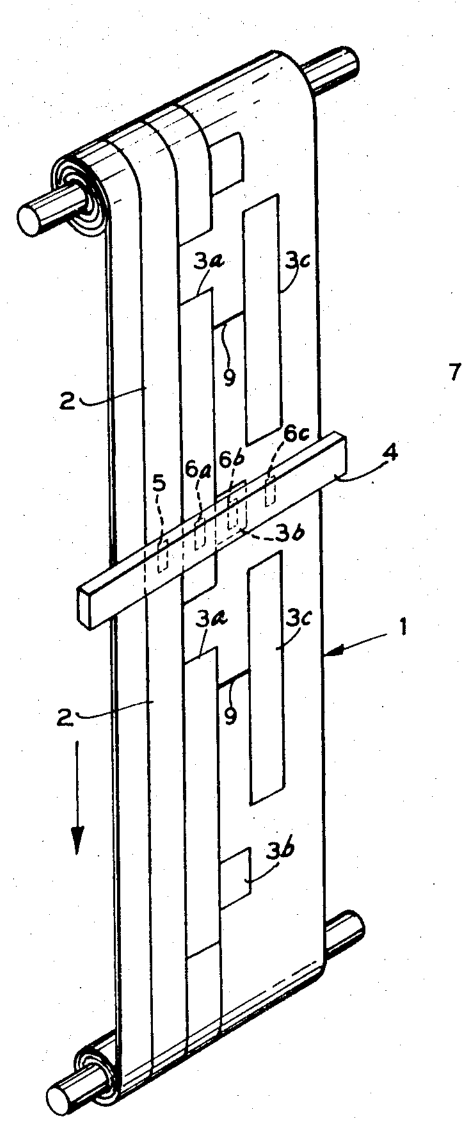
FIGURE 1 is a perspective diagrammatic drawing showing the improved means of providing an electrostatically digitized tape display system.
Figure 1A:
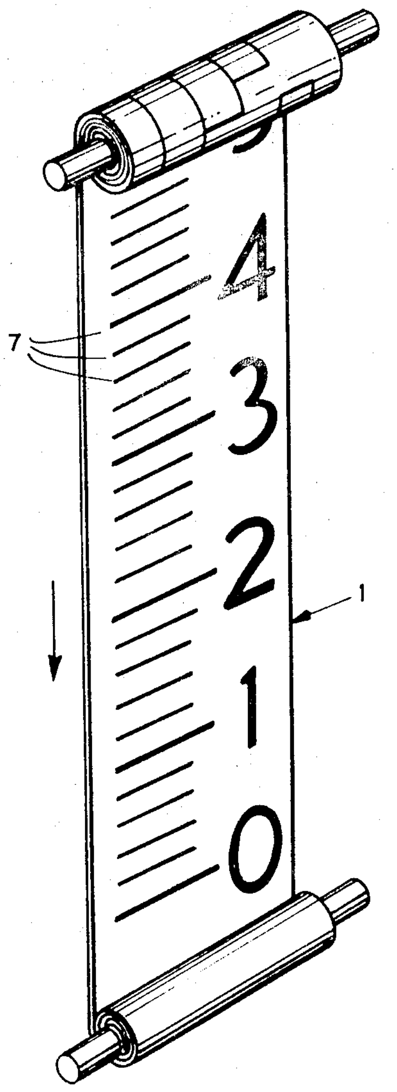
FIGURE 1A is a perspective diagrammatic drawing showing the tape of FIGURE 1 having a functional scale thereon.

Referring now to the drawing of FIGURE 1, numeral 1 designates a display tape of suitable material with a graduated functional scale 7 on one side, as best shown in FIGURE 1A. A thin metallic common input channel 2, and a plurality of thin metallic output channels, shown herein for purposes of example as being three in number, and generally indicated by numerals **3*a*, 3*b* and 3*c* are provided on the other side of tape 1**.

In order to provide appropriate electrostatic action, it is necessary to connect each of the output channels **3*a*, 3*b* and 3*c* with the common input channel 2. This is accomplished by a direct connection wherein output channel 3*a* is arranged so as to be in contact with input channel 2, a connection through another output channel, wherein output channel 3*b* is arranged to be in contact with output channel 3*a* which is in contact with input channel 2, or by providing a separate connecting element 9 connecting output channel 3*c* to the adjacent output channel 3*a*, which is in contact with channel 2**.

In order to protect against wear and to prevent shorting of channels 2, **3*a*, 3*b* and 3*c* to a reader head 4, these channels may be covered with a thin film of a nonconductive material such as nylon. The length and the number of output channels 3*a*, 3*b* and 3*c* is a function of the display scale factor, range, and the desired resolution required of the display. The digital code so formed thus bears a direct relation to scale 7 embodied on the other side of tape 1**. As an example, a display means may be constructed having a resolution of .010 inch and 15 output channels in order to display an altitude parameter of zero to 80,000 feet, with a scale of 1000 feet per inch of tape displayed and a resolution 10 feet.

Reader head 4 comprises a capacitive means having a common input plate 5 and a plurality of output plates shown herein for purposes of example as being three in number and generally designated by numerals **6*a*, 6*b* and 6*c*. One such output plate is provided for each output channel 3*a*, 3*b* and 3*c* embodied in tape 1. When an alternating current input is applied to common input plate 5, the respective outputs received from output plates 6*a*, 6*b* and 6*c* will vary as the capacitive reactance varies due to the proximity of a metallic output channel 3*a*, 3*b* or 3*c* on tape 1 to these plates. In FIGURE 1, as output plates 6*a* and 6*b* are adjacent respectively to output channels 3*a* and 3*b* and input plate 5 is adjacent to input channel 2**, an increase in capacitive reactance occurs due to a change in dielectric characteristics. As the proximity of the metallic output channels to the output plates varies, and as output channel 3*c* becomes adjacent to output plate 6*c*, due to the longitudinal movement of tape 1 relative to reader head 4 as indicated by the arrows, the voltage output detected at the output plates 6*a*, 6*b* and 6*c* will vary according to the following relationships:

(1) $X_C=1/2\pi fc$ (2) $E=IX_C$ where:

$X_C$=capacitive reactance
$f$=frequency
C=capacitance
E=voltage
I=current

Figure 2:
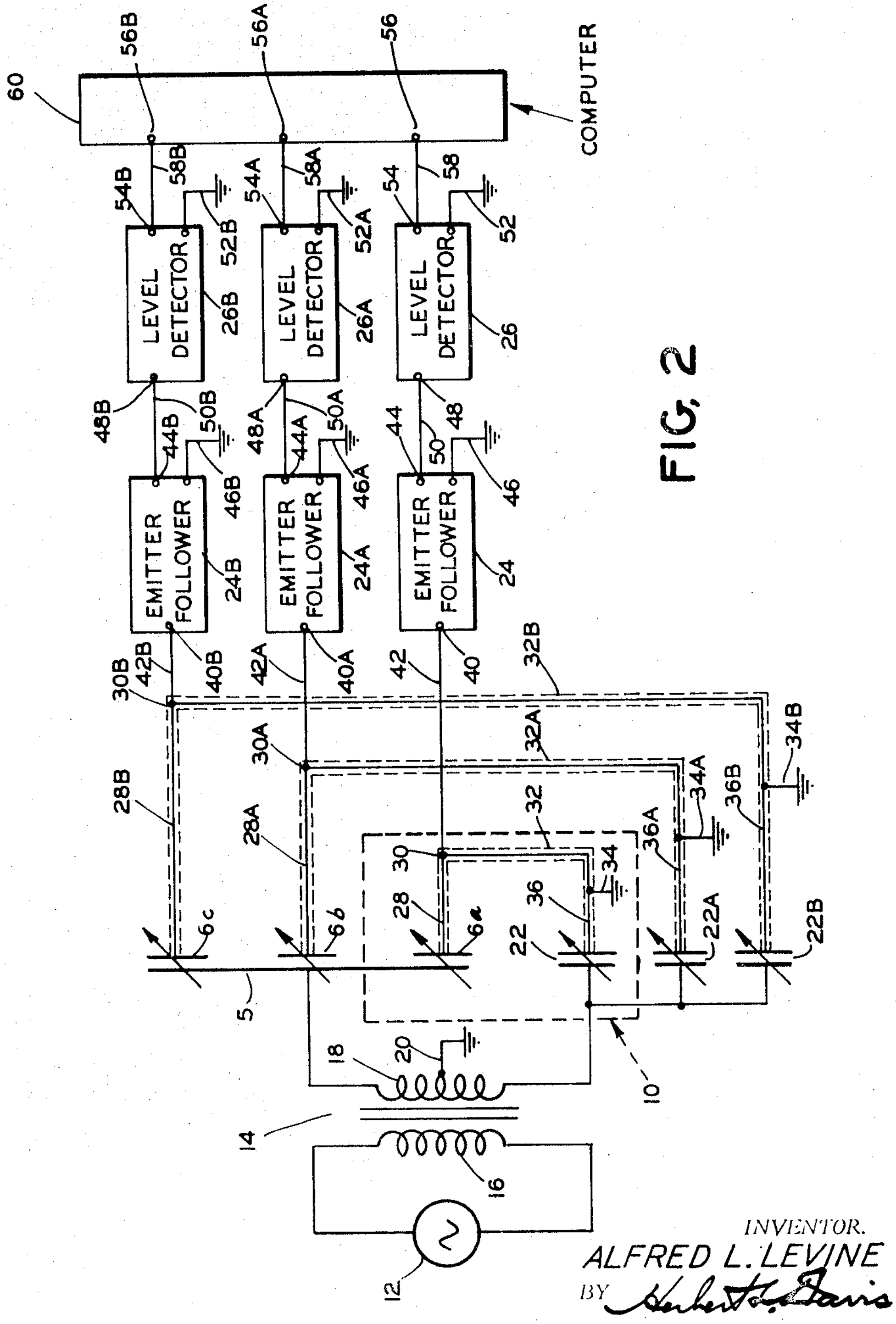
FIGURE 2 is a schematic wiring diagram showing typical electrical interconnections embodied in the invention.

This voltage variation may then be applied to various feedback devices including a digital encoder by means shown in FIGURE 2.

Referring now to FIGURE 2, a readout circuit is indicated generally by numeral 10. This circuit comprises an alternating current input supply 12 coupled to a transformer 14 to accomplish a phase angle variation. A primary winding 16 of the transformer 14 is connected across the power supply 12 and inductively coupled to a secondary winding 18 having a center tap ground connection 20. One leg of the secondary winding 18 is connected to common input plate 5 while the other leg is connected to an adjustable capacitor 22. A readout is provided by output plate 6*a* being in cooperative arrangement with input plate 5 to sense the change in dielectric characteristics as depicted in FIGURE 1 and indicated in the description thereof. Adjustable capacitor 22 is provided and adjusted so as to reduce the residual signal and lower the noise ratio which would have otherwise been in degradation of the desired voltage signal.

The change in dielectric characteristics so detected may then be applied as a voltage signal to a feedback device which, for purposes of example, is here shown as including an emitter follower designated generally by numeral 24 and a level detector designated generally by numeral 26. Emitter follower 24 is arranged so as to match the impedance of readout circuit 10 with the impedance of level detector 26. Emitter follower 24 and level detector 26 are more fully described in the referenced U.S. application Ser. No. 406,680.

An output detected at output plate 6*a* is coupled through a conductor 28 and joined at a point 30 with the output from adjustable capacitor 22 coupled through a conductor 36. Outputs coupled through conductor 28 and the conductor 36 are shielded by a shield 32 with shield 32 connected to a grounded conductor 34.

The combined output at point 30 is connected to an input 40 of emitter follower 24 through a conductor 42, with emitter follower 24 connected to a grounded conductor 46.

The output signal at an output 44 of emitter follower 24 is applied to an input 48 of level detector 26 through a conductor 50. Level detector 26 is connected to a grounded conductor 52, and an output 54 of level detector 26 is connected to an input 56 of a utilizing means shown generally as a computer 60, through a conductor 58.

Readout circuits corresponding to readout circuit 10 are formed by input plate 5 and output plate 6*b* and 6*c* as referred to and described with reference to FIGURE 1. Primary winding 16 of transformer 14 is connected across power supply 12 and inductively coupled through secondary winding 18 of transformer 14 having center tap ground connection 20.

One leg of secondary winding 18 of transformer 14 is connected to common input plate 5 and the other leg of secondary winding 18 of transformer 14 is connected to adjustable capacitors 22A and 22B which are provided and adjusted so as to lower the noise ratio which would otherwise be in degradation of the desired signal.

The outputs detected from output plates 6*b* and 6*c* through conductors 28A and 28B are joined at points 30A and 30B, respectively, with outputs from capacitors 22A and 22B through conductors 36A and 36B. The aforenoted outputs are shielded by shields 32A and 32B, with shields 32A and 32B being connected to grounded conductors 34A and 34B respectively. The combined outputs at points 30A and 30B are connected through conductors 42A and 42B, emitter followers 24A and 24B, conductors 50A and 50B, level detectors 26A and 26B and conductors 58A and 58B, respectively, to inputs 56A and 56B of computer 60.

Corresponding parts to those described with reference to the readout circuit 10 have been indicated by corresponding numerals bearing the subscript letter A and which parts operate in a corresponding manner.

For purposes of example, only three such interconnected circuit systems have been indicated and described. In application, a plurality of such circuit systems, coupled in parallel, one circuit for each of the output channels, such as the channels 3*a*, 3*b* and 3*c*, as heretofore described with reference to FIGURE 1, is required with the digitally encoded data output from each system being interconnected with the utilizing means designated herein as computer 60.

Although the novel means described herein has been incorporated in an aircraft instrumentation display system, it should be understood that it may be used in any system that employs a tape display means and requires that such means be interconnected to a feedback device.

While several embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An electrostatically digitized tape display means, comprising:

an elongated tape having a functional scale thereon;
a plurality of output channels on the tape coded to the functional scale;
an input channel on the tape common to each of the plurality of output channels and connected thereto;
at least one of the output channels being of greater length than the other of said output channels;
a reader head disposed adjacent to the tape;
an electrically energized capacitive means on the reader head having a plurality of output plates corresponding to the output channels on the tape and a common input plate corresponding to the input channel on the tape; and,
the tape and reader head being arranged for relative motion between the channels on the tape and the capacitive means on the reader head to change the dielectric characteristics of the capacitive means causing digital signals corresponding to the functional scale on the tape.

2. A device as defined by claim 1 including:

the input channel being of greater length than the greatest length of the output channels; and,
the input channel being rendered electrically continuous with each of the plurality of output channels.

3. A device defined by claim 1 including:

each of the plurality of output plates being arranged with the common input plate so as to provide a plurality of readout circuits for producing a plurality of signal voltage patterns upon the input plate being electrically energized; and,
means to move the tape relative to the reader head causing the input channel and the output channels on the tape to become adjacent to the input plate and the output plates on the reader head.

4. A device as defined by claim 3 including:
means to effect longitudinal movement of the tape, said tape having a visual functional scale on one side thereof, said common input channel and the plurality of output channels being provided on the other side of the tape; and,
said output channels having a frequenecy and length being arranged in a predetermined relation to the functional scale so as to effect the digital signals corresponding to the functional scale upon longitudinal movement of the tape relative to the reader head.

5. A device as defined by claim 4 including:
an electrical circuit being provided for energizing the common input plate; and,
a plurality of readout circuits being provided, with each of the plurality of readout circuits being connected to a corresponding output plate to provide digital signals at the outputs of said circuits corresponding to the functional scale on the tape upon the longitudinal movement of the tape relative to the reader head.

6. A device as defined by claim 5, wherein each of said readout circuits includes:
one of said output plates;
an electronic control circuit connected to the output plate;
an electronic detection circuit connected to an output of the electronic control circuit, said electronic control circuit being provided to match the impedance of the readout and electronic detection circuits; and,
the output from the electronic detection circuit providing digitally encoded signals.

7. A device as defined by claim 2 including:
the input channel being rendered electrically continuous with the plurality of output channels by the output channels being arranged in contacting relation with the input channel.

8. A device as defined by claim 2 including:
a plurality of connecting elements providing an electrical connection between the output channels and the input channel so as to render the input channel electrically continuous with the plurality of output channels.

9. A device as defined by claim 2 including:
one of said output channels being disposed in contacting relation with the input channel and the other of said output channels being disposed in contacting relation with said one output channel so as to render the input channel electrically continuous with the plurality of output channels.

References Cited

UNITED STATES PATENTS

| | | | |
|---|---|---|---|
| 2,512,879 | 6/1950 | Roggenstein | 235—61.116 X |
| 2,822,130 | 2/1958 | Nolde et al. | 340—347 X |
| 3,044,694 | 7/1962 | Davidson | 235—61.116 |
| 3,054,996 | 9/1962 | Spaulding et al. | 340—347 |
| 3,111,660 | 11/1963 | Stupar | 340—347 |
| 3,156,911 | 11/1964 | Ziserman | 340—347 |
| 3,189,731 | 6/1965 | Bowman | 235—61.116 |
| 3,286,252 | 11/1966 | Bose et al. | 340—347 |

MAYNARD R. WILBUR, Primary Examiner

G. R. EDWARDS, Assistant Examiner

U.S. Cl. X.R.

235—61.11